July 21, 1959  R. H. SMITH  2,895,739
VACUUM CHUCKS

Filed Feb. 13, 1956  4 Sheets-Sheet 4

Inventor
R. H. SMITH
By Rule and Hoge,
Attorneys

United States Patent Office 2,895,739
Patented July 21, 1959

2,895,739

VACUUM CHUCKS

Ralph H. Smith, Toledo, Ohio, assignor to Owens-Illinois Glass Company, a corporation of Ohio Application February 13, 1956, Serial No. 565,116

10 Claims. (Cl. 279—3)

My invention relates to chucks and associated means for accurately locating a workpiece on a chuck and holding it in position while the chuck is rotated. The invention as herein described and illustrated is particularly adapted for holding the glass face plates of picture tubes, such as used in television, during the sealing operation by which the face plate is welded to the funnel body of the tube.

An object of the present invention is to provide improved means for accurately positioning the face plate on a chuck and then securely holding it during the sealing operation.

In accordance with the present invention there is provided a chuck mounted for rotation about a horizontal axis. Rest pads or contact elements are mounted on the chuck in position to engage the face of the face plate when the latter is placed on the chuck and accurately control the position of the face plate on the chuck during the rotation. Additional rest pads, mounted on carriers pivoted to the chuck, are positioned to contact the bottom and an end marginal surface of the face plate while the chuck is at rest, thereby centering the face plate on the chuck. Means are provided for then swinging the carriers to withdraw the marginal rest pads from the sealing area of the face plate. A suction head mounted in the chuck for rotation therewith holds the face plate in position against the face engaging rest pads. An air operated piston motor is operatively connected to the marginal rest pads for withdrawing them from the sealing area before rotation of the chuck.

Referring to the accompanying drawings which illustrate a preferred form of the invention:

Figure 1:
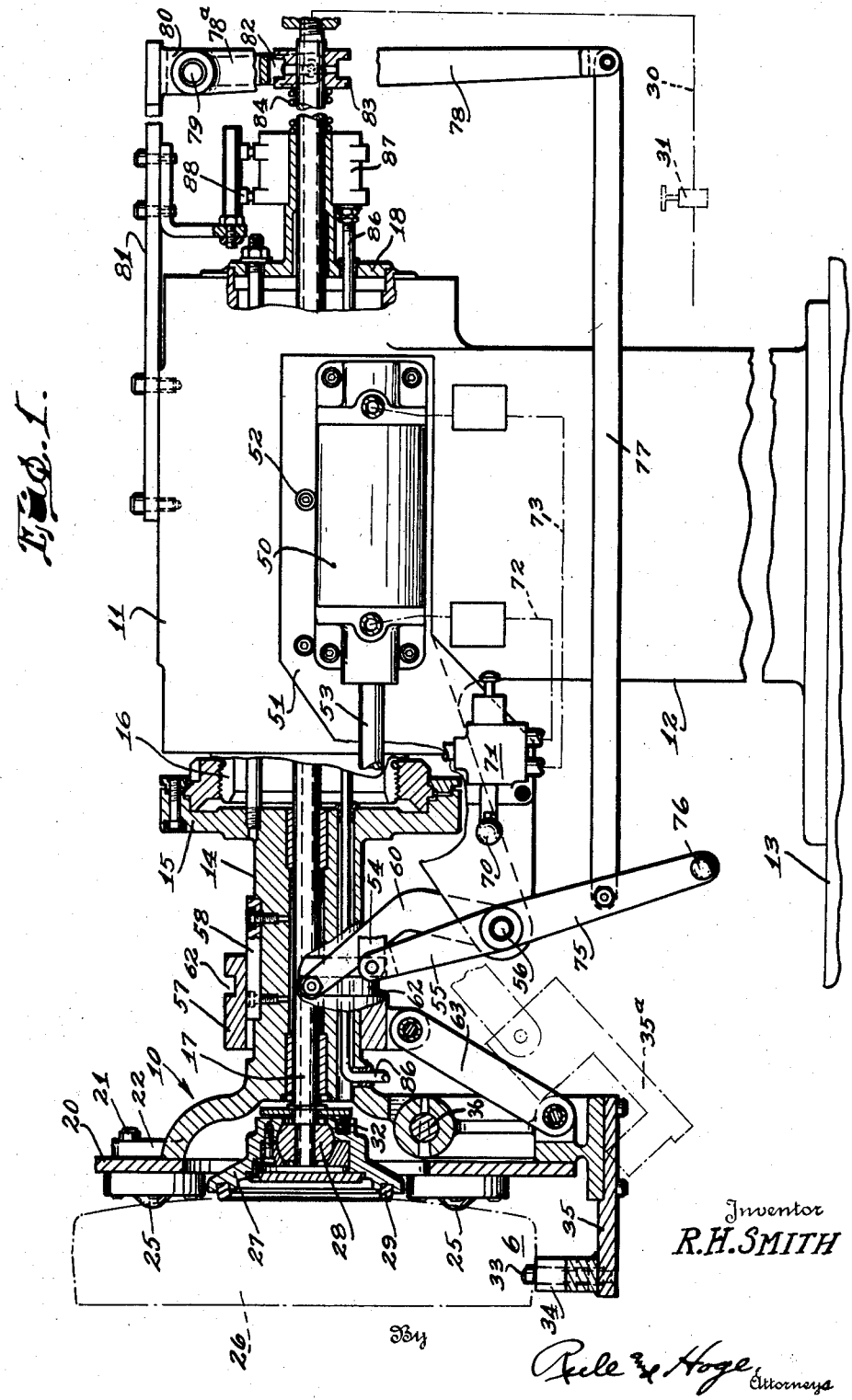
Fig. 1 is a part sectional side elevation of the apparatus, the section being at the line 1—1 on Fig. 2.
Figure 3:
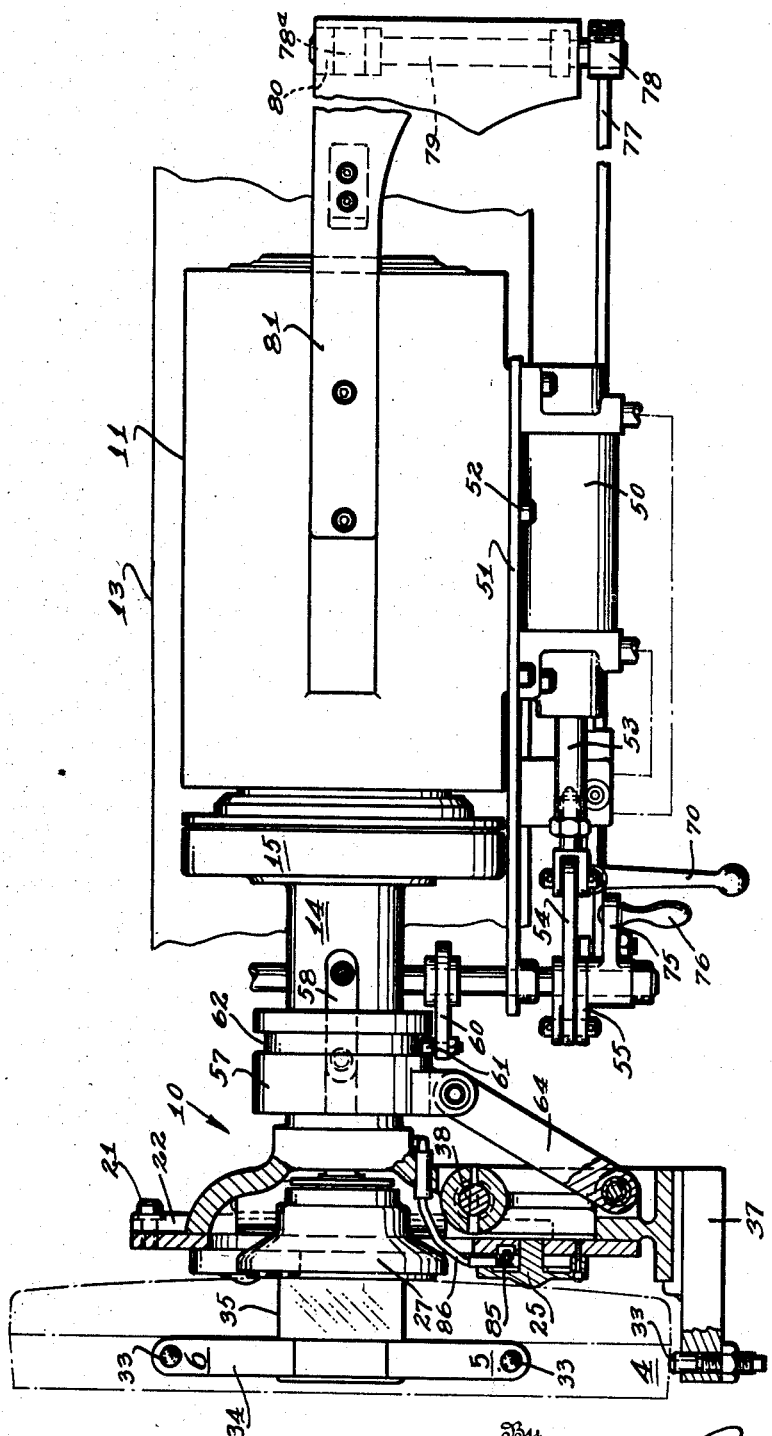
Fig. 3 is a plan view with a portion in section at the line 3—3 on Fig. 2.

Referring to Figs. 1 and 3, the chuck 10 is mounted for rotation about a horizontal axis. The chuck is journalled for rotation in a case 11 carried on a standard 12 which is slidably mounted on a lathe bed 13 for horizontal movement of the chuck. The chuck includes a cylindrical body 14 formed with an end flange or head 15 which is attached to a rotor 16 journalled within the case 11 and power driven for rotating the chuck. A horizontal shaft 17 extends lengthwise through a central bore in the chuck body 14 to which it is connected for rotation about its axis. The shaft also extends through a bearing member 18 which is journalled in the case 11 and rotates with the chuck. The shaft 17 is movable lengthwise in the chuck.

Figure 2:
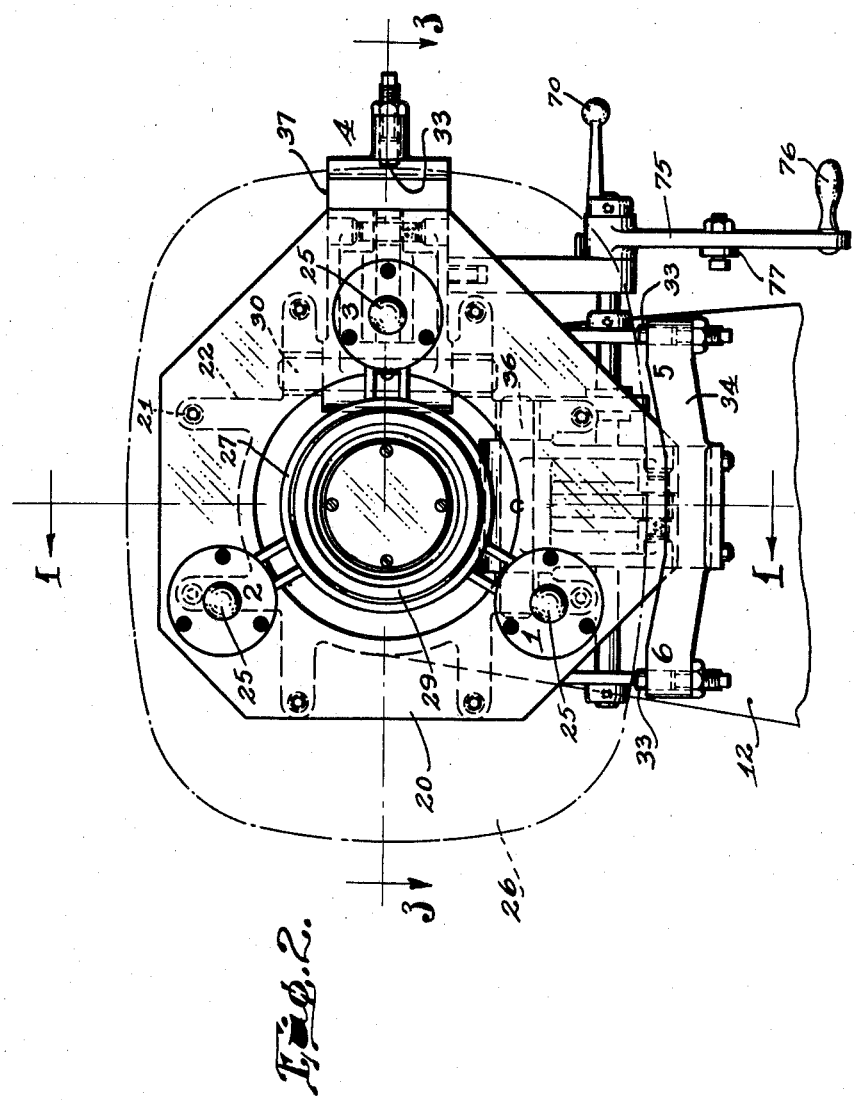
Fig. 2 is an end elevational view of the apparatus.

A vertical plate 20 is attached to the chuck body 14 by means of bolts 21 extending through arms 22 (Figs. 1 and 2) formed on the chuck. The plate 20 forms a holder for a series of rest pads or buttons 25, herein referred to as face pads. These face pads are mounted on the holder 20 and serve as stops or supports against which the face plate 26 bears and by which the face plate is held vertical or normal to the axis of rotation during the sealing operation. The face plate is held against the pads 25 by suction applied within a vacuum head 27 attached to the forward end of the shaft 17. The vacuum head 27 functions as a gripping means for gripping the workpiece, namely, the face plate 26. The vacuum head has a universal joint connection with the shaft by means of a ball and socket joint 28 permitting the head to accommodate itself to the contour of the face plate. A sealing ring or gasket 29 mounted in the head 27 provides a hermetic seal between the vacuum head and the face plate. The shaft 17 has a central bore extending throughout its length and provides a conduit through which suction is applied to the head 27. The vacuum line 30 as shown in broken lines (Fig. 1) is provided with a valve 31 therein. Stiff springs 32 in the vacuum head hold the latter against loose movement while the chuck is open.

Figure 4:
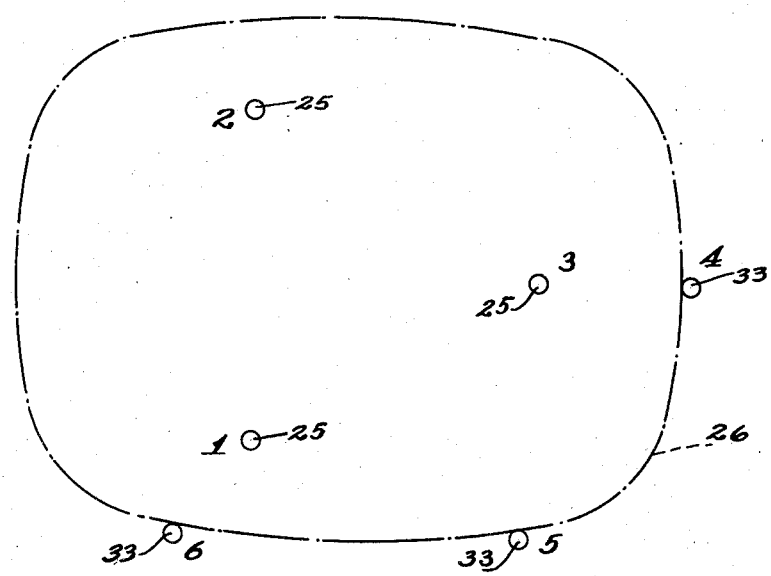
Fig. 4 is a diagrammatic face view of a face plate.
Figure 5:
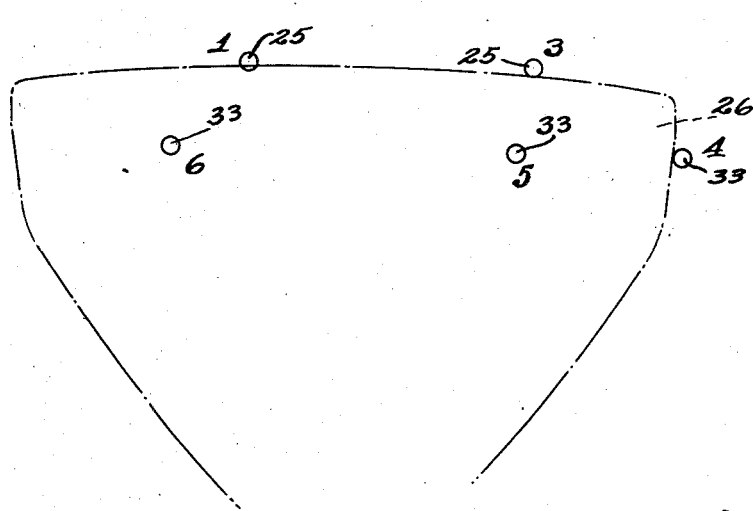
Fig. 5 is a diagrammatic side view of the same and the funnel body to which it is attached.

The face pads 25 may be located symmetrically with respect to the face plate 26 at the positions 1, 2, and 3 (Figs. 4 and 5).

An additional series of rest pads 33, herein referred to as marginal pads, are arranged to engage the marginal surfaces of the face plate and may be located at the positions 4, 5, and 6. The pads 33 at the positions 5 and 6 are mounted on a yoke 34 which is attached to and forms a part of a carrier comprising a frame 35. The carrier is keyed to a rock shaft 36 for swinging movement from operative position to the broken line position 35$^a$ (Fig. 1) for withdrawing the yoke 34 and pads thereon from the sealing area of the face plate. The pad 33 at the position 4 (Fig. 3) is in like manner mounted on a carrier frame 37 keyed to a rock shaft 38 for swinging movement to withdraw the pad from the face plate.

The means for withdrawing the pads 33 includes an air operated cylinder 50 having operating connections with the pads as presently described. The cylinder 50 is mounted on a plate 51 attached by bolts 52 to the case 11. The motor piston 53 is connected through a link 54 to a rock arm 55 keyed to a rock shaft 56. A sleeve 57 is mounted on the chuck body 14 for movement lengthwise thereon. A spline 58 connects the sleeve 57 for rotation with the chuck. A rock arm 60 keyed to the rock shaft 56 carries the roll 61 running in an annular track or groove 62 in the sleeve 57.

The reciprocation of the piston rod 53 operates through the connections just described, including the rock arms 55 and 60 to move the sleeve 57 lengthwise of the chuck. This sleeve is operatively connected through a link 63 (Fig. 1) to the carrier 35 for withdrawing the lower rest pads 33 away from the face plate. When the sleeve 57 is moved away from the face plate the rest pad at position 4 is at the same time withdrawn by means of a link 64 (Fig. 3) which connects the sleeve 57 to the swinging frame 37.

The operation of the cylinder 50 is manually controlled by a hand lever 70 operatively connected to a motor control valve 71. Air pressure lines 72 and 73 extend from the valve 71 to the cylinder 50.

Means for moving the vacuum head 27 to operative position includes a rock arm 75 mounted to swing on the shaft 56 and provided with a handle 76. A horizontal rod or link 77 is pivoted at its forward end to the rock arm 75 and is connected at its opposite end to a rock arm 78 keyed to a rock shaft 79 journalled in bearings 80 carried by a plate 81 bolted to the case 11. A rock arm 78$^a$ fixed to the rock shaft 79 is formed with a yoke 82 which engages a collar 83 keyed to the shaft 17. A coil spring 84 mounted on the shaft 17 and held under compression, bears against collar 83 and is operative to move the shaft 17 lengthwise for withdrawing the vacuum head 27 to inoperative position, and also for holding the face plate against the face pads 25.

As the face plate 26 is at a high temperature during the sealing operation there is provided means for heating the rest pads 25 to prevent checking, chilling, or marring of the glass. Such means includes electrical heaters 85 (Fig. 3) mounted in the pads 25. Insulated conductors 86 extend from the heaters through channels in the body 14 of the chuck (Fig. 1) and through the case 11 to a rotor 87 mounted to rotate the chuck. Electric current is supplied from any suitable source through brushes 88 to the rotor 87. The rest pads 25 are rounded or pointed to make point contact with the glass.

Operation

While the chuck is at rest a hot face plate 26 is placed in position thereon with the face of the plate in contact with the rest pads 25 which adjust and hold the plate in its vertical position normal to the axis of the chuck. The face plate also rests on the lower marginal pads 33 at positions 5 and 6 and with the end of the face plate against the pad 33 at position 4. The operator then by means of the handle 76 moves the shaft 17 forward against the opposing pressure of spring 84, thereby bringing the vacuum head into engagement with the face plate so that it grips the plate. The handle is then immediately released, allowing the spring 84 to pull and hold the plate in position against the pads 25, the reacting force of the spring being applied to the pads. The operator then by means of the handle 70 operates the motor control valve 71 so that the motor 50 operates to retract the sleeve 57 thereby withdrawing the marginal contact pads 33 into position to prevent interference with the welding operation. The chuck is then rotated during the welding operation while the face plate is securely held against the rest pads 25.

Modifications may be resorted to within the spirit and scope of my invention as defined in the appended claims.

I claim:

1. Apparatus for positioning and holding a heated face plate of a picture tube while being welded to the body of the tube, said apparatus comprising a chuck mounted for rotation about a horizontal axis, a horizontal shaft mounted in the chuck for lengthwise movement and for rotation with the chuck, a vacuum head having a universal joint connection with the shaft at the forward end thereof, said vacuum head and shaft being concentric with said axis of rotation, a series of face pads mounted on the chuck and shaped to make point contact with the face plate, the said pads being distributed around said axis with the contact points approximately within the same vertical plane, a series of marginal rest pads positioned to engage the marginal surfaces of the face plate, carriers for said marginal rest pads pivotally connected to the chuck for swinging movement by which the pads carried thereby are withdrawn from the face plate, a piston motor, means providing operating connections between the motor piston and said carriers, manually operable control means for the motor, means for moving said shaft and vacuum head forward to engage said head with the face plate when the latter has been positioned against the face pads, means for vacuumizing the said head, and spring means for moving the said head in a direction to hold the face plate against the face pads.

2. The combination of a chuck mounted for rotation about an axis, a holder mounted for rotation with the chuck about said axis, a plurality of point contact elements carried by said holder and distributed around said axis with their contact points substantially in a plane perpendicular to said axis and in position to make point contacts with a workpiece and position the workpiece on the chuck, gripping means for gripping the workpiece, means for applying a pulling force to the said gripping means in a direction parallel with said axis and with the reacting force applied to the said contact elements, whereby the workpiece is held against the contact elements during the rotation of the chuck, said gripping means comprising a vacuum head mounted for movement lengthwise of said axis and for rotation with the chuck, said means for applying force comprising spring means for applying force to the vacuum head in a direction to hold the workpiece against said contact elements.

3. The combination of a chuck mounted for rotation about an axis, a holder mounted for rotation with the chuck about said axis, a plurality of point contact elements carried by said holder and distributed around said axis with their contact points substantially in a plane perpendicular to said axis and in position to make point contacts with a workpiece and position the workpiece on the chuck, gripping means for gripping the workpiece, means for applying a pulling force to the said gripping means in a direction parallel with said axis and applying the reacting force to the said contact elements in the opposite direction parallel with said axis and thereby holding the workpiece against the contact elements during the rotation of the chuck, said gripping means comprising a vacuum head mounted for movement lengthwise of said axis and for rotation with the chuck, said means for applying force comprising spring means for applying said pulling force to the vacuum head in a direction to hold the workpiece against said contact elements, additional contact elements in position to engage marginal surfaces of the workpiece when the latter is placed on the chuck, and means for withdrawing said last mentioned contact elements from the workpiece and holding them in the withdrawn position during the rotation of the chuck.

4. The combination of a chuck mounted for rotation about an axis, a plurality of face pads mounted for rotation with the chuck and distributed around said axis and having contact surfaces shaped to make point contact with the face of a workpiece in positions to hold the workpiece with the contact points substantially in a plane normal to the axis of rotation, a plurality of marginal rest pads mounted for rotation with the chuck and positioned to engage marginal surfaces of the workpiece, means for gripping the workpiece, and means for applying a force to the gripping means in one direction lengthwise of said axis and concurrently applying a counter-balancing force to the face pads in the reverse direction and thereby holding the workpiece against the face pads during the rotation of the chuck.

5. The apparatus defined in claim 4 including means operable to withdraw said marginal pads after the workpiece has been gripped by said gripping means and holding said marginal pads in a retracted position during the rotation of the chuck.

6. The apparatus defined in claim 4, the said gripping means comprising a vacuum head mounted for movement lengthwise of said axis into position to engage the face plate when the latter is positioned against said face pads, the said force applying means comprising means for applying a retracting force to the vacuum head by which the workpiece is held against said face pads during the rotation of the chuck.

7. The apparatus defined in claim 4, the means for gripping the workpiece including a vacuum head, a shaft concentric with said axis of rotation, means providing a universal joint connection between said shaft and the vacuum head, means for manually moving the shaft and vacuum head forward from a retracted position in which the vacuum head is out of contact with the workpiece and thereby engaging the vacuum head with a workpiece while the latter is positioned against the face pads, the said force applying means comprising spring means for applying a retracting force to the said shaft and vacuum head by which the workpiece is held against the face pads during the rotation of the chuck.

8. The combination of a chuck comprising a cylindrical body mounted for rotation about a horizontal axis, contact elements positioned to engage marginal surfaces of a face plate when the latter is placed on the chuck and thereby positioning the face plate on the chuck, a carrier on which said contact elements are mounted, said carrier being pivotally connected to the chuck for swinging movement by which the said contact elements are withdrawn from the face plate, a sleeve mounted on the said cylindrical body for movement axially therealong, means connecting said sleeve to the body for rotation therewith, a link connecting said sleeve to said carrier, a motor, and means providing an operating connection between the motor and said sleeve for effecting said axial movement of the sleeve and through said link operating to swing said carrier and withdraw the contact elements from the face plate and hold them in retracted position during the rotation of the chuck.

9. A chuck comprising a cylindrical body mounted for rotation about a horizontal axis, a vacuum head mounted for rotation with said body about said axis and movable lengthwise thereof to and from an operative position, contact elements arranged to engage marginal surfaces of a workpiece on the chuck, carriers on which the contact elements are mounted, said carriers being pivotally connected to the chuck for swinging movement by which the contact elements are withdrawn from operative position to a retracted position, a sleeve mounted on said body for sliding movement lengthwise thereof, links connecting said sleeve with said carriers, a piston motor, and means providing operating connections between the motor and said sleeve.

10. Apparatus for positioning and holding a face plate of a cathode-ray tube while being welded to the body of the tube, said apparatus including a chuck mounted for rotation about an axis, a shaft mounted in the chuck concentric with said axis for lengthwise movement and for rotation with the chuck, a vacuum head having a universal joint connection with the shaft at the forward end thereof, face pads mounted on the chuck for contact with the face plate, said pad being distributed around the said axis with their contacting surfaces substantially within a plane normal to said axis, marginal rest pads positioned to engage the marginal surfaces of the face plate, carriers for said marginal rest pads pivotally connected to the chuck for swinging movement by which the pads carried thereby are withdrawn from the face plate, means for withdrawing the rest pads from the face plate, means for moving the said shaft and vacuum head forward and thereby bringing the vacuum head into engagement with the face plate when the latter has been positioned against the face pads, means for vacuumizing the said head and thereby attaching it to the face plate, and spring means for applying a retracting force to said head in a direction to hold the attached face plate against the face pads.

References Cited in the file of this patent

UNITED STATES PATENTS

| | | |
|---|---|---|
| 1,275,447 | Hodny et al. | Aug. 13, 1918 |
| 2,203,917 | Malloy | June 11, 1940 |
| 2,372,516 | Rechton et al. | Mar. 27, 1945 |
| 2,512,274 | Hawk | June 20, 1950 |
| 2,796,313 | Schumacher | June 18, 1957 |
| 2,807,180 | Adams | Sept. 24, 1957 |

FOREIGN PATENTS

| | | |
|---|---|---|
| 536,858 | Great Britain | May 29, 1941 |